(12) United States Patent
Winokur

(10) Patent No.: US 8,015,436 B2
(45) Date of Patent: Sep. 6, 2011

(54) RESILIENT DATA STORAGE IN THE PRESENCE OF REPLICATION FAULTS AND ROLLING DISASTERS

(75) Inventor: Alex Winokur, Haifa (IL)

(73) Assignee: Axxana (Israel) Ltd, Tel Aviv (IL)

( * ) Notice: Subject to any disclaimer, the term of this patent is extended or adjusted under 35 U.S.C. 154(b) by 203 days.

(21) Appl. No.: 12/463,438

(22) Filed: May 11, 2009

(65) Prior Publication Data

US 2009/0287967 A1 Nov. 19, 2009

Related U.S. Application Data

(60) Provisional application No. 61/128,283, filed on May 19, 2008.

(51) Int. Cl.
*G06F 11/00* (2006.01)

(52) U.S. Cl. .......................... 714/6.12; 714/42

(58) Field of Classification Search .................. 714/5, 6, 714/42
See application file for complete search history.

(56) References Cited

U.S. PATENT DOCUMENTS

| | | | |
|---|---|---|---|
| 5,027,104 A | 6/1991 | Reid | |
| 5,546,533 A * | 8/1996 | Koyama | ............ 714/5 |
| 5,594,900 A | 1/1997 | Cohn et al. | |
| 5,623,597 A | 4/1997 | Kikinis | |
| 5,724,501 A | 3/1998 | Dewey et al. | |
| 5,799,141 A | 8/1998 | Galipeau et al. | |
| 5,841,768 A | 11/1998 | Ozluturk et al. | |
| 5,889,935 A * | 3/1999 | Ofek et al. | ............ 714/6 |
| 6,105,078 A | 8/2000 | Crockett et al. | |
| 6,144,999 A | 11/2000 | Khalidi et al. | |
| 6,158,833 A | 12/2000 | Engler | |
| 6,173,377 B1 | 1/2001 | Yanai et al. | |
| 6,226,651 B1 | 5/2001 | Masuda et al. | |

(Continued)

FOREIGN PATENT DOCUMENTS

EP 0420425 A2 4/1991

(Continued)

OTHER PUBLICATIONS

International Application PCT/IL2006/000453 International Preliminary Report on Patentability dated Nov. 1, 2007.

(Continued)

*Primary Examiner* — Marc Duncan
(74) *Attorney, Agent, or Firm* — D. Kligler I.P. Services Ltd

(57) ABSTRACT

A method for data protection includes, in a first operational mode, sending data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device.

An indication of a fault related to storage of the data in the secondary storage device is received. Responsively to the indication, operation is switched to a second operational mode in which the data items are sent for storage at least in the primary storage device and are cached and retained in the disaster-proof storage unit irrespective of the successful storage of the data items in the secondary storage device.

28 Claims, 2 Drawing Sheets

U.S. PATENT DOCUMENTS

| | | | |
|---|---|---|---|
| 6,260,125 | B1 | 7/2001 | McDowell et al. |
| 6,324,654 | B1 | 11/2001 | Wahl et al. |
| 6,389,552 | B1 | 5/2002 | Hamilton et al. |
| 6,658,590 | B1 * | 12/2003 | Sicola et al. .............. 714/6 |
| 6,842,825 | B2 | 1/2005 | Geiner et al. |
| 6,859,865 | B2 | 2/2005 | De Margerie |
| 6,954,875 | B2 | 10/2005 | Liu |
| 6,976,186 | B1 | 12/2005 | Gardner |
| 7,020,743 | B2 | 3/2006 | Lee et al. |
| 7,111,189 | B1 * | 9/2006 | Sicola et al. .............. 714/6 |
| 7,148,802 | B2 | 12/2006 | Abbroscato et al. |
| 7,185,228 | B2 | 2/2007 | Achiwa |
| 7,188,292 | B2 | 3/2007 | Cordina et al. |
| 7,383,405 | B2 | 6/2008 | Vega et al. |
| 7,451,355 | B1 * | 11/2008 | Coatney et al. ............ 714/42 |
| 7,478,266 | B2 | 1/2009 | Gatto et al. |
| 7,487,311 | B2 | 2/2009 | Stroberger et al. |
| 7,707,460 | B2 * | 4/2010 | Hyde et al. ............... 714/42 |
| 7,797,582 | B1 * | 9/2010 | Stager et al. ............. 714/42 |
| 2001/0047412 | A1 | 11/2001 | Weinman |
| 2002/0162112 | A1 | 10/2002 | Javed |
| 2003/0014523 | A1 | 1/2003 | Teloh et al. |
| 2003/0097607 | A1 | 5/2003 | Bessire |
| 2003/0204597 | A1 | 10/2003 | Arakawa et al. |
| 2004/0012316 | A1 | 1/2004 | Davis |
| 2004/0030837 | A1 | 2/2004 | Geiner et al. |
| 2004/0044649 | A1 | 3/2004 | Yamato et al. |
| 2004/0044865 | A1 | 3/2004 | Sicola et al. |
| 2004/0059844 | A1 | 3/2004 | Jones et al. |
| 2004/0064639 | A1 | 4/2004 | Sicola et al. |
| 2004/0073831 | A1 | 4/2004 | Yanai et al. |
| 2004/0153717 | A1 | 8/2004 | Duncan |
| 2004/0193802 | A1 | 9/2004 | Meiri et al. |
| 2004/0230352 | A1 * | 11/2004 | Monroe ..................... 701/3 |
| 2005/0005001 | A1 | 1/2005 | Hara et al. |
| 2005/0015657 | A1 | 1/2005 | Sugiura et al. |
| 2005/0027892 | A1 | 2/2005 | McCabe et al. |
| 2005/0243609 | A1 | 11/2005 | Yang et al. |
| 2005/0280421 | A1 | 12/2005 | Yomoda et al. |
| 2006/0025897 | A1 | 2/2006 | Shostak et al. |
| 2006/0031468 | A1 | 2/2006 | Atluri et al. |
| 2006/0075148 | A1 * | 4/2006 | Osaki ........................ 710/5 |
| 2007/0079088 | A1 * | 4/2007 | Deguchi et al. ........... 711/162 |
| 2007/0094467 | A1 | 4/2007 | Yamasaki |
| 2007/0124789 | A1 | 5/2007 | Sachson et al. |
| 2007/0198613 | A1 | 8/2007 | Prahlad et al. |
| 2007/0266197 | A1 * | 11/2007 | Neyama et al. ............ 710/310 |
| 2008/0001128 | A1 | 1/2008 | Goldberg |
| 2008/0004904 | A1 | 1/2008 | Tran |
| 2008/0061963 | A1 | 3/2008 | Schnitz et al. |
| 2008/0104443 | A1 * | 5/2008 | Akutsu et al. .............. 714/6 |
| 2008/0177964 | A1 | 7/2008 | Takahashi et al. |
| 2008/0201390 | A1 | 8/2008 | Anguelov |
| 2008/0263363 | A1 | 10/2008 | Jueneman et al. |
| 2008/0297346 | A1 | 12/2008 | Brackman et al. |
| 2009/0007192 | A1 | 1/2009 | Singh |
| 2009/0094425 | A1 | 4/2009 | Winokur |
| 2009/0216969 | A1 | 8/2009 | Winokur |

FOREIGN PATENT DOCUMENTS

| | | |
|---|---|---|
| RU | 2128854 C1 | 4/1999 |
| RU | 2221177 C2 | 1/2004 |
| WO | 01/97030 A1 | 12/2001 |
| WO | 2006/111958 A2 | 10/2006 |
| WO | 2008/049703 A2 | 5/2008 |

OTHER PUBLICATIONS

International Application No. PCT/IL2008/001052 Search Report dated Nov. 19, 2008.
Chinese Patent Application No. 200680017546.1 Official Action dated Dec. 26, 2008.
Goldfire LTD., "Technology and Solutions Developed for Our Clients", Brussels, Belgium, 2009.
Firetrust, "FireTrust Technology", Brussels, Belgium, 2009.
International Application No. PCT/IL2006/000453 Search Report dated Mar. 9, 2007.
Russian Patent Application No. 2007141777 Official Action dated May 6, 2009.
U.S. Appl. No. 61/142,410 "Disaster-proof data storage unit" filed on Jan. 5, 2009.
U.S. Appl. No. 61/143,842 "Disaster-proof cellular transmission" filed on Jan. 12, 2009.
EMC Corporation, "EMC SRDF Family: High-Performance remote replication for business continuity", USA (Sep. 6, 2006).
IBM Corporation, "Storage Solutions: Data Encryption within the Drive Itself", USA (Sep. 6, 2006).
U.S. Appl. No. 10/585,587 Official Action dated Aug. 20, 2009.
European Patent Application No. 06728254.1 Supplementary Search Report dated Aug. 19, 2009.
"Flexible Min-K: Product Information", Thermal Ceramics Inc, Jan. 2008.
Russian Patent Application # 2009126283 Official Action dated Sep. 7, 2010.
U.S. Appl. No. 12/721,580 Official Action dated Sep. 28, 2010.
U.S. Appl. No. 12/228,315 Official Action dated Sep. 9, 2010.
U.S. Appl. No. 10/585,587 Official Action dated Dec. 7, 2009.
European Patent Application No. 06728254.1 Official Action dated Jan. 22, 2010.
European Patent Application No. 06728254.1 Official Action dated Sep. 3, 2009.
International Application PCT/IB2009/051919 Search Report dated Oct. 16, 2009.
International Application PCT/IB2010/050041 Search Report dated Jun. 8, 2010.
International Application PCT/IB2009/055961 Search Report dated Jun. 24, 2010.
ANSI/INCITS standard 269-1996, "Information Technology—SCSI-3 Fibre Channel Protocol (FCP)", American National Standards Institute (ANSI) and the International Committee for Information Technology Standards (INCITS), Apr. 8, 1996.
International Application PCT/IB2010/055421 filed on Nov. 25, 2010.
International Application PCT/IB2010/053427 Search Report dated Dec. 27, 2010.
U.S. Appl. No. 12/228,315 Official Action dated Feb. 18, 2011.
U.S. Appl. No. 12/721,580 Official Action dated Feb. 23, 2011.
Russian Patent Application No. 2009126283 Official Action dated Mar. 1, 2011.
Nadporojski, G., "Review of GSM-telephone Benefon Twin+", published on http://www.ixbt.com, Jan. 9, 2001.
EP Application # 11150100.3 Partial Search Report dated Mar. 1, 2011.

* cited by examiner

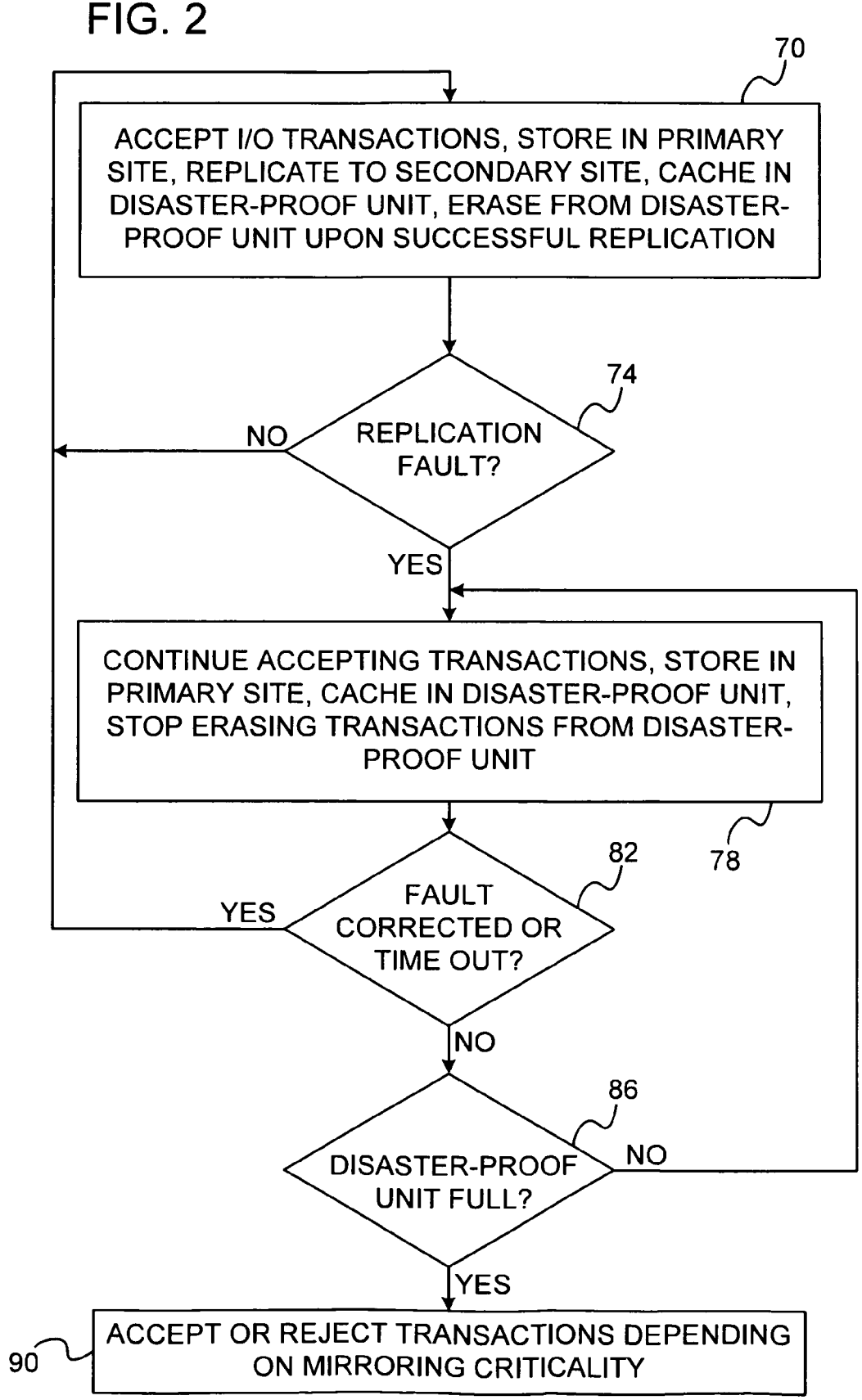

RESILIENT DATA STORAGE IN THE PRESENCE OF REPLICATION FAULTS AND ROLLING DISASTERS

CROSS-REFERENCE TO RELATED APPLICATIONS

This application claims the benefit of U.S. Provisional Patent Application 61/128,283, filed May 19, 2008, whose disclosure is incorporated herein by reference.

FIELD OF THE INVENTION

The present invention relates generally to data protection, and particularly to methods and systems for resilient data storage using disaster-proof storage devices.

BACKGROUND OF THE INVENTION

Various techniques for protecting data against disaster events are known in the art. For example, PCT International Publication WO 2006/111958, whose disclosure is incorporated herein by reference, describes a method for data protection, which includes accepting data for storage from one or more data sources. The data is sent for storage in a primary storage device and in a secondary storage device. While awaiting an indication of successful storage of the data in the secondary storage device, a record associated with the data is temporarily stored in a disaster-proof storage unit adjacent to the primary storage device. When an event damaging at least some of the data in the primary storage device occurs, the data is reconstructed using the record stored in the disaster-proof storage unit and at least part of the data stored in the secondary storage device.

SUMMARY OF THE INVENTION

An embodiment of the present invention provides a method for data protection, including:

in a first operational mode, sending data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device;

receiving an indication of a fault related to storage of the data in the secondary storage device; and responsively to the indication, switching to operating in a second operational mode in which the data items are sent for storage at least in the primary storage device and are cached and retained in the disaster-proof storage unit irrespective of the successful storage of the data items in the secondary storage device.

In some embodiments, the data items include Input/Output (I/O) transactions that are received from one or more applications, and operating in the second operational mode includes continuing to receive the I/O transactions from the applications while the fault is present. In an embodiment, switching to operating in the second operational mode includes operating in the second operational mode for a predefined time duration following the indication, and switching back to the first operational mode after the predefined time duration.

In a disclosed embodiment, after switching to operating in the second operational mode, a notification related to memory unavailability in the disaster-proof storage device is received, and an action is performed responsively to the notification. Performing the action may include switching back to the first operational mode responsively to the notification, and/or prompting a user responsively to the notification. In a disclosed embodiment, performing the action includes selecting the action from a group of actions including refusing to accept subsequent data items following the notification, and storing the subsequent data items only in the primary storage device. Selecting the action may include choosing the action responsively to a predefined configuration parameter.

In some embodiments the data items retained in the disaster-proof storage device are sent for storage in the secondary storage device following correction of the fault. In another embodiment, operating in the second operational mode includes allowing acceptance of subsequent data items for a predefined time period following the indication, responsively to determining that the fault is associated with an unidentifiable software failure. In yet another embodiment, operation in the first operational mode continues irrespective of the indication, responsively to determining that the fault is associated with an identifiable software failure.

In still another embodiment, the method includes refusing to accept subsequent data items for a predefined time period responsively to detecting a failure in caching the data items in a disaster-proof storage unit. In an embodiment, the data items are accepted from one or more software applications, and refusing to accept the subsequent data items includes initially refusing to accept the subsequent data items for a first time period that does not disrupt the software applications, and, responsively to an assessed cause of the failure, continuing to refuse to accept the subsequent data items for a second time period that is longer than the first time period.

There is additionally provided, in accordance with an embodiment of the present invention, a data protection apparatus, including:

an interface, which is configured to receive data items from one or more data sources; and a processor, which is configured to operate in a first operational mode by sending the data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device, and which is configured, responsively to receiving an indication of a fault related to storage of the data in the secondary storage device, to switch to operating in a second operational mode, in which the data items are sent for storage at least in the primary storage device and are cached and retained in the disaster-proof storage unit, by instructing the disaster-proof storage unit to retain the data items irrespective of the successful storage of the data items in the secondary storage device.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for data protection, in accordance with an embodiment of the present invention.

DETAILED DESCRIPTION OF EMBODIMENTS

Overview

Figure 1:
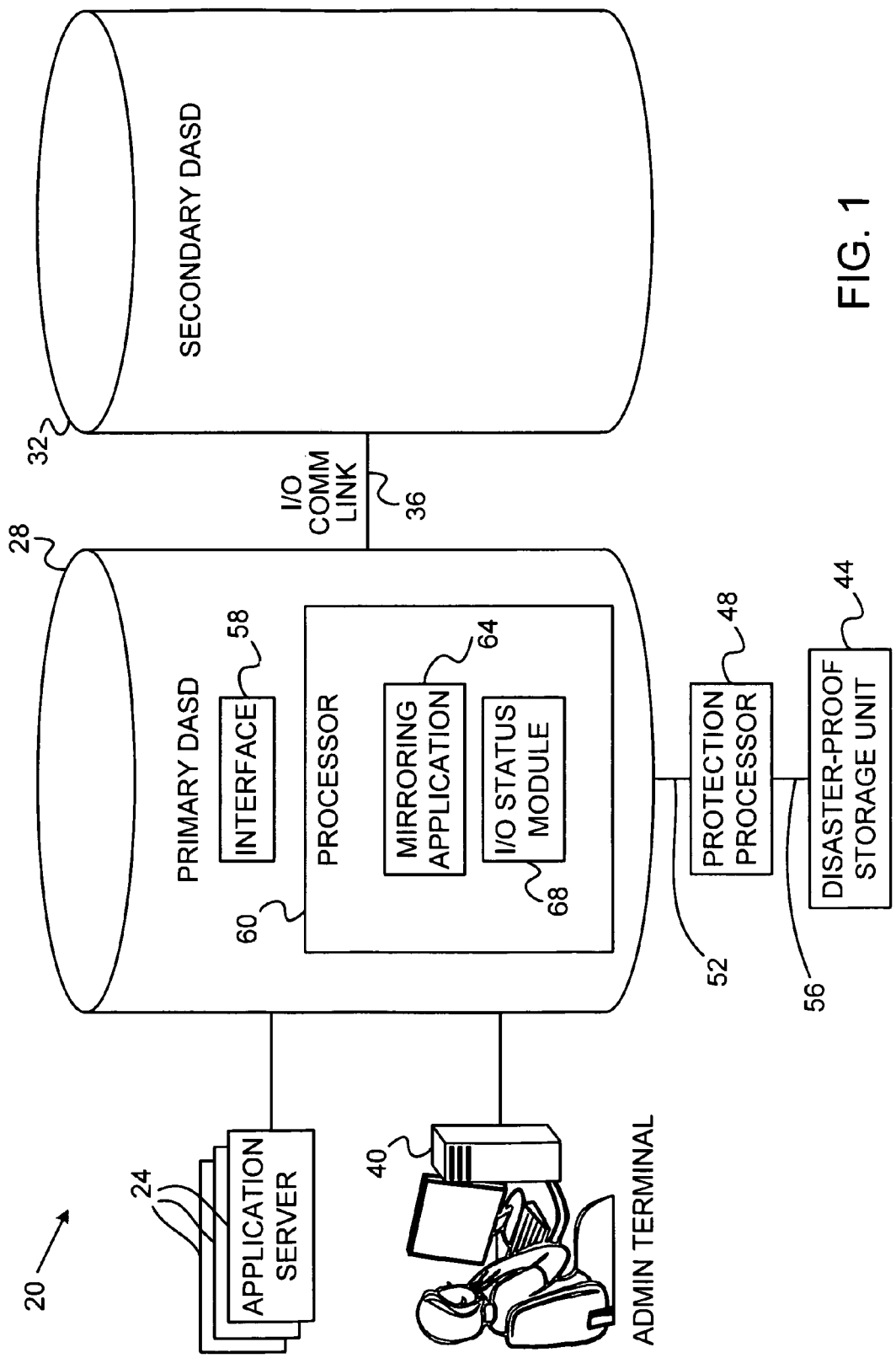
FIG. 1 is a block diagram that schematically illustrates a data protection system, in accordance with an embodiment of the present invention.

Many data protection systems replicate data in primary and secondary storage devices in order to protect the data against disaster events. In such a system, data replication in the secondary storage device may fail for various reasons, such as communication link failures, failures in the replication software or other system components, or because of a rolling disaster that caused the replication fault but has not yet hit the primary storage device.

One possible reaction to a replication fault may be to refuse to accept new data for storage. This sort of reaction, however, typically suspends the applications that produce the data. Another possible reaction is to continue accepting data, and to store the data only in the primary storage device without replication. A reaction of this sort does not suspend the applications, but on the other hand does not offer data protection.

Embodiments of the present invention that are described hereinbelow provide improved methods and systems for data protection in the presence of replication faults. In some embodiments, data items (e.g., I/O transactions) are accepted from one or more data sources. The data items are sent for storage in a primary storage device and a secondary storage device. The data items are cached temporarily in a disaster-proof storage unit, which is typically adjacent to the primary storage device.

Under normal conditions, the data items are cached in the disaster-proof storage unit until they have been stored successfully in the secondary storage device. In other words, when a given data item is replicated successfully, it is deleted from the disaster-proof storage unit. Once a replication fault is detected, however, incoming data items are retained in the disaster-proof storage unit regardless of whether or not they have been replicated successfully in the secondary storage device. This mode of operation typically continues until the memory of the disaster-proof storage unit is full, typically on the order of fifteen minutes. If caching in the disaster-proof storage unit fails for some reason, acceptance of additional data items is refused for a short time period that does not yet suspends the applications (e.g., 45 seconds). This short blockage period is used for assessing whether the failure is caused by a rolling disaster in the vicinity of the primary site, or by equipment failure in or around the disaster-proof storage unit.

The methods and systems described herein are highly-effective in mitigating temporary replication faults, such as communication or equipment faults. When using the disclosed techniques, data items received during a temporary replication fault are cached in the disaster-proof storage unit, and are replicated in the secondary storage device after the fault is corrected. This caching and replication process is performed without suspending the applications and without loss of data protection. If the replication fault is caused by a permanent fault or a rolling disaster, on the other hand, the data items can later be recovered from the disaster-proof storage unit and the secondary storage device.

System Description

FIG. 1 is a block diagram that schematically illustrates a data protection system 20, in accordance with an embodiment of the present invention. System 20 accepts data items from one or more data sources, and stores the data items in a mirrored configuration in order to protect them against disaster events. In the present example, the data sources comprise one or more application servers 24, and the data items comprise Input/Output (I/O) transactions, which are produced by applications running on servers 24. More particularly, the data items may comprise I/O write operations.

System 20 stores the accepted transactions in a primary storage device 28, and replicates the transactions in a secondary storage device 32 via a communication link 36. The primary and secondary storage devices are typically distant from one another, such that replication of the transactions protects the data against disaster events that may hit the primary storage device. The primary and secondary storage devices may comprise disks, magnetic tapes, computer memory devices and/or devices based on any other suitable storage technology. In some embodiments, the storage devices comprise internal processors that perform local data storage and retrieval-related functions. In the present embodiment, the primary and secondary storage devices comprise Direct Access Storage Devices (DASDs). Alternatively, however the storage devices may comprise any other suitable storage device type. In some embodiments, system 20 comprises an administrator terminal 40, using which an administrator or other user can control and configure the operation of the system.

System 20 further comprises a disaster-proof storage unit 44, which is used for temporary caching of transactions that are in the process of being replicated and stored in secondary storage device 32. Unit 44 is typically adjacent to primary storage device 28, and is constructed so as to withstand and survive disaster events that may hit the primary storage device. Disaster-proof unit 44 is controlled by a protection processor 48. For example, the protection processor accepts from the primary storage device transactions for caching, and sends them to unit 44. The protection processor also receives from the primary storage device instructions to delete certain transactions from unit 44, for example when these transactions are known to be stored successfully in the secondary storage device. Protection processor 48 is connected to the primary storage device using a communication link 52, and to the disaster-proof storage unit using a communication link 56.

Primary storage device 28 comprises an interface 58 for interacting with application servers 24, and a storage processor 60 that carries out the methods described herein. In particular, interface 58 accepts transactions for storage from the application servers, and sends the application servers acknowledgements indicating that the transactions have been stored successfully.

Processor 60 comprises a mirroring application 64 and an I/O status module 68. The mirroring application manages the data replication functions of system 20. For example, the mirroring application receives transactions for storage via interface 58 and sends copies of the transactions to the primary storage device, the secondary storage device and the protection processor. The mirroring application also receives acknowledgements from the primary storage device, the secondary storage device and/or the protection processor, indicating that the transactions have been stored successfully. In response to these acknowledgements, the mirroring application sends acknowledgements to the application servers via interface 58, and/or instructs the protection processor to delete certain transactions from the disaster-proof storage unit.

I/O status module 68 controls the behavior of the applications running on servers 24, during normal operation and in the presence of replication faults. In particular, module 68 controls whether the applications stop or continue sending transactions for storage. I/O module 68 receives completion status indications from mirroring application 64, from primary storage device 28 and from protection processor 48, notifying the I/O module whether a given transaction was stored successfully in the secondary storage device, the primary storage device and the disaster-proof storage unit, respectively. Based on the received status indications, module 68 sends completion status indications to the applications. Using these indications, the I/O status module can cause the applications to stop or continue sending transactions for storage. The functions of module 68 are described in greater detail further below.

The configuration shown in FIG. 1 is an example configuration, which is chosen purely for the sake of conceptual clarity. In alternative embodiments, various other suitable system configurations can be used. For example, system 20 may comprise multiple primary storage devices, secondary storage devices and/or disaster-proof storage units. As another example, some or all of the functions of processor 60 may be implemented on a processor that is external to primary storage device 28. In one embodiment, the functions of processor 60 and of processor 48 may be implemented in a common processor. As yet another example, protection processor 48 may be located between the data sources and the primary storage device, or between the primary storage device and the secondary storage device.

In alternative embodiments, system 20 may accept and store any other suitable kind of data items accepted from any other suitable kind of data source, such as, for example, communication transactions produced by a telephony system such as a Private Automatic Branch Exchange (PABX) or a telephony switch, and/or information produced by a surveillance system, security system or access control system such as a closed-circuit television (CCTV) system.

Additional aspects of the disaster-proof storage unit, mirroring application and protection processor, as well as methods and system configurations for data storage using such elements, are addressed in PCT International Publication 2006/111958, cited above, and in U.S. patent application Ser. No. 12/228,315, which is assigned to the assignee of the present patent application and whose disclosure is incorporated herein by reference. Typically, processors 48 and 60 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

Data Protection in the Presence of Replication Faults

Under normal conditions, system 20 stores each incoming I/O transaction in primary storage device 28, sends the transaction for storage in secondary storage device 32, and caches the transaction in disaster-proof storage unit 44 until the transaction is stored successfully in the secondary storage device. When a given transaction is stored successfully in the secondary storage device, the system deletes the copy of this transaction that is cached in disaster-proof storage unit 44. In other words, the disaster-proof storage unit caches only the transactions that are not yet stored successfully in the secondary storage device. Thus, at any given time, each transaction is backed-up in secondary storage device 32, in disaster-proof storage unit 44, or in both. If a disaster event damages the data stored in primary storage device 28, the data can be recovered based on the data stored in unit 44 and in secondary storage device 32.

The above-described replication scheme can sometimes be disrupted by various kinds of replication faults that occur in system 20. In the present context, the term "replication fault" means any fault that affects the storage of data items in secondary storage device 32, in the disaster-proof storage unit 44, or in both.

In some cases, a replication fault may be caused by a rolling disaster event, i.e., a disaster event that evolves over time and gradually affects additional elements of system 20. In some scenarios, a rolling disaster event may affect the replication functionality of the system before it hits the primary storage device. During this interim time period, such an event manifests itself as a replication fault. When a rolling disaster of this sort finally hits the primary site, the data of write operations that occurred in this interim period are typically lost (assuming the fault disrupted replication to the remote site and the applications running on application server 24 were not stopped). The techniques described herein prevent this data loss.

In other scenarios, however, replication faults may be caused by various kinds of equipment faults in system 20, such as communication faults in communication links 36, 52 and 56, and/or software or hardware faults in the various elements of system 20. These kinds of replication faults may sometimes be associated with a rolling disaster, but in many cases it is difficult to determine the cause when the fault is detected. In these scenarios, if replication is disrupted but applications are not stopped, and assuming the fault is later corrected and replication is resumed, data will not be lost since no disaster will typically follow the detection of the fault.

In many cases, if the disaster originates outside the premises of the primary site (sometimes referred to as a regional rolling disaster), the delay from the time at which a rolling disaster event damages the replication functionality to the time at which the primary storage device is hit does not exceed fifteen minutes. When a disaster finally hits the primary site, the time interval from detection of a first fault in the primary site until all components fail is typically on the order of 45 seconds. This sort of event is referred to as a local rolling disaster.

In some embodiments of the present invention, when a replication fault that disrupts replication to secondary storage device 32 occurs, the primary storage device does not immediately refuse to receive incoming transactions from application servers 24. Instead, the primary storage device continues to receive transactions for storage, but retains these transactions in disaster-proof storage unit 44. In other words, upon detection of a replication fault, processor 60 in the primary storage device instructs protection processor 48 to stop deleting transactions from unit 44, irrespective of whether or not these transactions are stored successfully in the secondary storage device. In some embodiments, this mode of operation continues until the memory of disaster-proof storage unit 44 fills up (e.g., on the order of fifteen minutes), by which time if a disaster did not hit the primary site it is likely that the fault is not associated with a disaster. In this latter case, the replication may be stopped and applications can continue writing data to primary DASD 28 without protection to secondary DASD 32.

When using this technique, temporary replication faults do not cause suspension of the applications running on servers 24. The applications do not suffer from unnecessary outages and may continue to operate during such faults. Since the incoming transactions are backed-up in the disaster-proof storage device for the period of time suspected to be a rolling disaster period, data protection is not compromised.

FIG. 2 is a flow chart that schematically illustrates a method for data protection, in accordance with an embodiment of the present invention. The method begins with system 20 operating in a normal operational mode, at a normal operation step 70. In this mode of operation, storage processor 60 in primary storage device 28 accepts transactions from application servers 24. Processor 60 stores a first copy of each transaction in the primary storage device, and sends a second copy of each transaction for mirrored storage in the secondary storage device. Processor 60 instructs protection processor 48 to cache a third copy of each transaction in disaster-proof storage unit 44. Upon successful storage of a given transaction in the secondary storage device (e.g., in response to an acknowledgement received from the secondary storage device), processor 60 instructs protection processor 48 to delete the copy of this transaction from unit 44.

Processor 60 checks whether a replication fault is present, at a fault checking step 74. If replication functions properly, i.e., if the transactions are stored successfully in the secondary storage device, the method loops back to step 70 above, and system 20 continues to operate in the normal operational mode.

If processor 60 receives an indication of a replication fault, it switches to operate in a fault operational mode, at a fault operation step 78. In this mode of operation, processor 60 continues to accept transactions from application servers 24, to store them in the primary storage device and to cache them in disaster-proof unit 44. Unlike the normal operational mode, however, in the fault operational mode there is no guarantee that the transactions are replicated in the secondary storage device. Therefore, processor 60 stops instructing the protection processor to delete transactions from disaster-proof storage unit 44. In other words, processor 60 retains the transactions cached in unit 44 regardless of whether or not they are stored successfully in the secondary storage device.

Processor 60 may switch back from the fault operational mode to the normal operational mode according to various conditions, such as after a predefined time period (e.g., fifteen minutes), in response to receiving an indication that the replication fault has been corrected, or using any other suitable condition. In the present example, processor 60 checks whether the replication fault has been corrected or whether a predefined time out expired, at a return checking step 82. If the fault is no longer present, the method loops back to step 70 above, and processor 60 returns to operate in the normal operational mode.

If, on the other hand, the replication fault persists, processor 60 checks whether the memory of the disaster-proof storage unit is full or about to become full, at a memory full checking step 86. If the disaster-proof storage unit still has free memory space to store subsequent transactions, the method loops back to step 78 above, and processor 60 continues to operate in the fault operational mode.

If the memory of disaster-proof unit 44 is full, processor 60 cannot continue to cache transactions in unit 44. Replication in the secondary site is also not available because of the replication fault. At this stage, processor 60 begins to operate at a protection-less operational mode 90. The functionality of this mode may vary, for example, depending on the importance of mirroring the transactions. In some embodiments, system 20 has a global configuration parameter denoted "mirroring criticality."

When the mirroring criticality is high, processor 60 refuses to accept incoming transactions when operating in the protection-less mode, since it is not able to protect these transactions. This refusal, however, typically suspends the applications. In this sort of operation, if a disaster hits the primary site, the transactions can be recovered using the disaster-proof unit and the secondary storage device without data loss, even if the fault is not associated with a rolling disaster.

When the mirroring criticality is low, processor 60 continues to accept transactions without mirroring them in the secondary storage device or caching them in the disaster-proof storage unit. The transactions are stored in the primary storage device, typically without protection. This sort of operation, however, allows the applications to continue running. This sort of operation may be based on an assumption that if a disaster did not hit the primary site up to this point in time, the replication fault is probably not associated with a disaster event.

In some embodiments, the specification of system 20 allows a certain maximum amount of data to be lost in the event of a disaster. The allowed value is referred to as "LAG" and may be expressed, for example, as a maximum number of transactions that may be lost, a maximum data size (e.g. in MB) that may be lost, or as a maximum time period following the disaster in which transactions may be lost. The actual amount of data that is lost following a given disaster event is referred to as a Recovery Point Objective (RPO), and is typically expressed in the same units as the LAG.

When implementing the method of FIG. 2, the memory size of disaster-proof unit 44 is typically designed to enable caching of transactions during a time period that is characteristic of evolution of a rolling disaster. Consider, for example, an embodiment in which processor 60 is configured to bypass replication mode after fifteen minutes. In this embodiment, the memory in unit 44 should typically be large enough to cache the transaction volume accepted over a period of fifteen minutes plus the specified LAG.

In some embodiments, the amount of data that can be cached in unit 44 following a replication fault may be user-configurable (within the limits of the memory size of unit 44). For example, an administrator may set this value using terminal 40. In these embodiments, at step 86 of the method of FIG. 2, processor 60 checks whether the memory of unit 44 is filled up to the maximum specified level.

Processor 60 may take various measures when the memory of unit 44 is about to become full (or when the cached transactions are about to reach the maximum specified level). For example, processor 60 may issue an alert to the administrator using terminal 40. The administrator may perform various actions in response to such an alert. For example, the administrator may specify that the applications are allowed to continue running without caching transactions in unit 44. Alternatively, the administrator may specify that the subsequent transactions are rejected, and that the applications are therefore suspended.

Software faults can often be classified into identifiable and unidentifiable faults. Identifiable faults typically comprise bugs that can be detected and reported by software logic running on the processor in question before it is reset. Typically although not necessarily, identifiable faults tend to occur in user space. When an identifiable software fault is detected, processor 60 typically causes the application server to continue operating even when mirroring is stopped, for a period of time needed for recovering from the fault. Unidentifiable faults typically comprise bugs that halt the processor in question and affect other software that may run on the processor. Typically although not necessarily, unidentifiable faults tend to occur in kernel space. In many cases, unidentifiable software faults are indistinguishable from hardware failures and are treated accordingly, as described above.

In some cases, caching of transactions in disaster-proof storage unit 44 may fail. Such failure may be caused by a rolling disaster that hit the disaster-proof storage unit or its surroundings and is likely to hit the primary storage device a short time afterwards. On the other hand, caching in unit 44 may fail due to equipment failures that are not associated with a rolling disaster, e.g., failures in the disaster-proof storage unit or other system component (e.g., protection processor 48 or link 56). Caching may also sometimes fail due to a rolling disaster, but in many cases it is difficult to determine the cause when the caching failure is detected.

In some embodiments, processor 60 attempts to assess the cause for the caching failure and take appropriate measures. In an example embodiment, when processor 60 detects a failure to cache transactions in unit 44, the processor refuses to accept new transactions for storage from application servers 24 for a short blockage period. The length of this blockage period is chosen so that, if the caching failure is caused by a rolling disaster that hit unit 44, the disaster is likely to reach the primary storage device during this period. On the other hand, the blockage period is chosen to be sufficiently short, so that refusing to accept new transactions during this period will not to cause suspension of the applications. This criterion is important, since recovering the applications after suspension takes a relatively long time and is noticeable to the application users.

In a typical implementation, the short blockage period may be on the order of forty-five seconds long, although any other suitable length can also be used. The use of the short blockage period described above provides an interim step before blocking transactions for longer time periods (e.g., fifteen minutes) when replication to secondary storage device 32 fails too. As such, suspension of the applications is avoided unless absolutely necessary.

The mechanism described above can be applied using the following logic:

If both replication to the secondary storage device and caching in the disaster-proof storage unit function properly, operate in the normal operational mode.

If caching in the disaster-proof storage unit fails, and as long as replication to the secondary storage device is functional, it is sufficient to block transaction acceptance for a short time period (e.g., 45 seconds) in order to assess whether the caching failures is caused by a local rolling disaster or by equipment failure.

If both replication and caching fail, revert to longer blockage period (e.g., fifteen minutes).

I/O Status Module Functionality

As noted above, the acceptance or refusal of subsequent transactions from the application servers is managed by I/O status module 68. For a given transaction, the I/O control module typically receives completion status indications from mirroring application 64, primary storage device 28 and protection processor 48, processes these indications according to certain logic, and generates a composite status indication that is sent to the application. For both received and generated status indications, "positive status" means that the transaction is stored successfully, and "negative status" means it is not. Typically, a lack of response from a certain storage device for a certain time period is also considered a negative status.

In some embodiments, the method of FIG. 2 above can be implemented by operating the I/O status module according to the following logic:

Module 68 receives from protection processor 48 a status indication specifying the success of caching the transaction in disaster-proof storage unit 44.

As long as the status indication received from the protection processor is positive, a negative status indication from the mirroring application will not trigger rejection of subsequent transactions from the applications.

Following a negative status indication from the mirroring application, module 68 typically refrains from generating negative status indications to the application for a certain configurable time period (e.g., fifteen 15 minutes, or any other suitable time period that is typically needed for identifying a rolling disaster).

The I/O status module also receives indications of software faults, which affect the health of the replication functionality. If replication fails due to a software fault, module 68 generates a positive status indication to the application until the replication functionality recovers.

When module 68 identifies a connectivity failure or other replication fault, it instructs the protection processor to stop deleting data from the disaster-proof storage unit.

When module 68 receives an indication from the protection processor that the disaster-proof storage unit memory is about to become full, module 68 prompts the administrator via terminal 40. The administrator is requested to specify the appropriate action.

When the memory of the disaster-proof storage unit is full, I/O status module 68 generate an appropriate status indication, as explained above.

When module 68 identifies a failure to cache transactions in the disaster-proof storage unit, it generates a negative status (i.e., blocks transaction acceptance) for a short blockage period, e.g., 45 seconds, during which the cause for the caching failure is assessed.

Following a negative status indication from the mirroring application in the presence of a failure to cache transactions in the disaster-proof storage unit, module 68 typically generates a negative status (i.e., blocks transaction acceptance) for a long blockage period, e.g., 15 minutes, during which the causes for the failures are assessed.

EXAMPLE PSEUDO-CODE

This section provides example pseudo-code of four software components, which can be used to implement the methods described herein. The main functions of the four software components are as follows:

I/O Main_loop: A component representing the logic applied to each transaction. The main loop receives a transaction (e.g., I/O write operation) from a certain application and forwards the transaction to the primary storage device, the mirroring application and the protection processor. The main loop forwards the three resulting status indications to the I/O_status_generator component (below), so as to generate a composite status to the application.

I/O_status_generator: A component that generates a composite status indication to the application, based on the status indications received from the primary storage device, the mirroring application and the protection processor.

Allocate_Buffer: A component that allocates memory space within disaster-proof storage unit 44. The Allocate_Buffer component stops deleting data from unit 44 when instructed by the I/O_status_generation component.

Watchdog: An example of a mechanism for detecting and reporting software malfunction.

The four software components use the following variables:
DASD_status: Status indication returned by the primary storage device.

Protection_status: Status indication returned by the protection processor.
Replication_status: Status indication returned by the mirroring application.
Store_Flag: A global flag shared by the I/O_status_generation and Allocate_Buffer components. When this flag is set, the Allocate_Buffer component stops deleting data from unit 44.
Continue_with_balck_box_full: A global flag, which specifies the status to be returned to the application when the memory of the disaster-proof storage unit is full.
Protection: A global flag, which specifies whether or not caching in unit 44 functions properly.

```
    I/O Main_loop
    Set_timer = false
    Do forever
    {
        Accept transaction from application server
        Forward transaction to mirroring application,
            wait for replication_status
        Forward transaction to primary DASD, wait for
            DASD_status
        Forward transaction to protection processor,
            wait for protection_status
        Wait until all status indications are received
            or until time out expires
        Status = I/O_Status_Generator (DASD_status,
            protection_status,replication_status)
        Forward status to application
    }
    End Do
    I/O_Status_Generator  (DASD_status,protection_
        status,replication_status)
    {
      If bad DASD_status  or  DASD_status  time  out
    occurred Then /*Primary storage is bad*/
            Return check status
            If in block period Then    /*   wait  and  see  if
    rolling disaster is in progress*/
            Return check status
            protection=True  /*  indicate that data is cached
    successfully in disaster-proof unit */
            If      protection_status     times      out     and
    protection_status SW error was not reported in last 3
    minutes Then /* not a time out on account of Reboot */
            If not after 45-second block for this error
    Then     /*detected for the first time and suspected as
    disaster */
            {
              Block all writes for 45 seconds
              Return check status
            }
            Else
                protection=False /* failure in disaster-
    proof unit, not disaster */
            If protection status indicates HW error or SW
    error Then
            If not after 45 seconds block for this error
    Then
            {
              Block all writes for 45 seconds
              Return check status
            }
            Else
               protection=False
            If protection_status indicates memory near full
    condition Then /*how to proceed when memory of disaster-
    proof unit fills*/
            Prompt user to set Continue_with_balck_box_full
    to true or false
            If protection_status indicates memory full condition
    and Continue_with_black_box_full=false Then
            Return check status
            If replication_status indicates any error Then
            If protection = True Then /* regardless of the
```

```
    type of error (HW, SW or time-out), return good status
    and stop discarding data from disaster-proof unit*/
            {
              Set Store_Flag to Do_not_discard
              Return good status
            }
            Else
            {
              If not after 15-minute block for this error
    Then
            {
                Block   all   writes   for   15   minutes   /*to
    account for propagation of disaster from remote site */
                Return check status
            }
                Else    /*     bypass    replication    and    continue
    unprotected, 15 minutes have passed and no disaster has
    occurred */
            {
                Set Store_Flag to Do_not_discard
                Return good status
            }
            Return good status
    }
```

Although the embodiments described herein mainly address data protection schemes for mitigating replication faults, the methods and systems described herein can also be used in other applications, such as in database log protection and in various other data protection schemes.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data protection, comprising:
   sending data items for storage in a primary storage device and in a secondary storage device, while temporarily caching the data items in a disaster-proof storage unit;
   while storage of the data items in the secondary storage device is functional, operating in a first operational mode in which each cached data item is subsequently deleted from the disaster-proof storage unit; and
   in response to receiving an indication of a fault related to the storage of the data items in the secondary storage device, sending an instruction to switch to a second operational mode in which deletion of the cached data items from the disaster-proof storage unit is inhibited.

2. The method according to claim 1, wherein the disaster-proof storage unit is collocated with the primary storage device, and comprising, when the fault is related to a disaster event that damages the primary storage device, reconstructing the data items based on the data items that are stored in the secondary storage device and on the data items that are cached in the disaster-proof storage unit.

3. The method according to claim 1, wherein the data items comprise Input/Output (I/O) transactions that are received from one or more applications, and wherein the method comprises, while operating in the second operational mode, continuing to receive the I/O transactions from the applications while the fault is present.

4. The method according to claim 1, and comprising operating in the second operational mode for a predefined time duration following the indication, and switching back to the first operational mode after the predefined time duration.

5. The method according to claim 1, and comprising, after switching to operating in the second operational mode, receiving a notification related to memory unavailability in the disaster-proof storage device, and performing an action responsively to the notification.

6. The method according to claim 5, wherein performing the action comprises prompting a user responsively to the notification.

7. The method according to claim 5, wherein performing the action comprises selecting the action from a group of actions comprising:
 refusing to accept subsequent data items following the notification; and
 storing the subsequent data items only in the primary storage device.

8. The method according to claim 7, wherein selecting the action comprises choosing the action responsively to a predefined configuration parameter.

9. The method according to claim 1, and comprising, following correction of the fault, sending the data items cached in the disaster-proof storage device for storage in the secondary storage device.

10. The method according to claim 1, and comprising, while operating in the second operational mode, allowing acceptance of subsequent data items for a predefined time period following the indication, responsively to determining that the fault is associated with an unidentifiable software failure.

11. The method according to claim 1, and comprising refusing to accept subsequent data items for a predefined time period responsively to detecting a failure in caching the data items in a disaster-proof storage unit.

12. The method according to claim 11, wherein the data items are accepted from one or more software applications, and wherein refusing to accept the subsequent data items comprises:
 initially refusing to accept the subsequent data items for a first time period that does not disrupt the software applications; and
 responsively to an assessed cause of the failure, continuing to refuse to accept the subsequent data items for a second time period that is longer than the first time period.

13. A method for data protection, comprising:
 in a first operational mode, sending data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device;
 receiving an indication of a fault related to storage of the data in the secondary storage device;
 responsively to the indication, switching to operating in a second operational mode in which the data items are sent for storage at least in the primary storage device and are cached and retained in the disaster-proof storage unit irrespective of the successful storage of the data items in the secondary storage device; and
 after switching to operating in the second operational mode, receiving a notification related to memory unavailability in the disaster-proof storage device, and switching back to the first operational mode responsively to the notification.

14. A method for data protection, comprising:
 in a first operational mode, sending data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device;
 receiving an indication of a fault related to storage of the data in the secondary storage device;
 responsively to the indication, switching to operating in a second operational mode in which the data items are sent for storage at least in the primary storage device and are cached and retained in the disaster-proof storage unit irrespective of the successful storage of the data items in the secondary storage device; and
 continuing to operate in the first operational mode irrespective of the indication responsively to determining that the fault is associated with an identifiable software failure.

15. A data protection apparatus, comprising:
 an interface, which is configured to receive data items from one or more data sources; and
 a processor, which is configured to send the data items for storage in a primary storage device and in a secondary storage device while temporarily caching the data items in a disaster-proof storage unit, and which is configured to operate, while storage of the data items in the secondary storage device is functional, in a first operational mode in which each cached data item is subsequently deleted from the disaster-proof storage unit, and, in response to receiving an indication of a fault related to the storage of the data items in the secondary storage device, to send an instruction to switch to a second operational mode in which deletion of the cached data items from the disaster-proof storage unit is inhibited.

16. The apparatus according to claim 15, wherein the disaster-proof storage unit is collocated with the primary storage device, and wherein, when the fault is related to a disaster event that damages the primary storage device, the processor is configured to reconstruct the data items based on the data items that are stored in the secondary storage device and on the data items that are cached in the disaster-proof storage unit.

17. The apparatus according to claim 15, wherein the data items comprise Input/Output (I/O) transactions, wherein the interface is configured to receive the I/O transactions from one or more applications, and wherein the processor is configured to continue to receive the I/O transactions from the applications when operating in the second operational mode, while the fault is present.

18. The apparatus according to claim 15, wherein the processor is configured to operate in the second operational mode for a predefined time duration following the indication, and to switch back to the first operational mode after the predefined time duration.

19. The apparatus according to claim 15, wherein the processor is configured, after switching to operating in the second operational mode, to receive a notification related to memory unavailability in the disaster-proof storage device, and to perform an action responsively to the notification.

20. The apparatus according to claim 19, wherein the processor is configured to prompt a user responsively to the notification.

21. The apparatus according to claim 19, wherein the processor is configured to select the action from a group of actions comprising:

refusing to accept subsequent data items following the notification; and storing the subsequent data items only in the primary storage device.

22. The apparatus according to claim 21, wherein the processor is configured to select the action responsively to a predefined configuration parameter.

23. The apparatus according to claim 15, wherein the processor is configured to send the data items retained in the disaster-proof storage device for storage in the secondary storage device following correction of the fault.

24. The apparatus according to claim 15, wherein the processor is configured to allow acceptance of subsequent data items for a predefined time period following the indication, responsively to determining that the fault is associated with an unidentifiable software failure.

25. The apparatus according to claim 15, wherein the processor is configured to refuse to accept subsequent data items for a predefined time period responsively to detecting a failure in caching the data items in the disaster-proof storage unit.

26. The apparatus according to claim 25, wherein the data sources comprise one or more software applications, and wherein the processor is configured to initially refuse to accept the subsequent data items for a first time period that does not disrupt the software applications, and, responsively to an assessed cause of the failure, to continue to refuse to accept the subsequent data items for a second time period that is longer than the first time period.

27. A data protection apparatus, comprising:

an interface, which is configured to receive data items from one or more data sources; and a processor, which is configured to operate in a first operational mode by sending the data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device, and which is configured, responsively to receiving an indication of a fault related to storage of the data in the secondary storage device, to switch to operating in a second operational mode, in which the data items are sent for storage at least in the primary storage device and are cached and retained in the disaster-proof storage unit, by instructing the disaster-proof storage unit to retain the data items irrespective of the successful storage of the data items in the secondary storage device, wherein the processor is configured, after switching to operating in the second operational mode, to receive a notification related to memory unavailability in the disaster-proof storage device, and to switch back to the first operational mode responsively to the notification.

28. A data protection apparatus, comprising:

an interface, which is configured to receive data items from one or more data sources; and a processor, which is configured to operate in a first operational mode by sending the data items for storage in a primary storage device and in a secondary storage device, while temporarily caching the data items in a disaster-proof storage unit and subsequently deleting the data items from the disaster-proof storage unit, wherein each data item is deleted from the disaster-proof storage unit upon successful storage of the data item in the secondary storage device, and which is configured, responsively to receiving an indication of a fault related to storage of the data in the secondary storage device, to switch to operating in a second operational mode, in which the data items are sent for storage at least in the primary storage device and are cached and retained in the disaster-proof storage unit, by instructing the disaster-proof storage unit to retain the data items irrespective of the successful storage of the data items in the secondary storage device, wherein the processor is configured to continue to operate in the first operational mode irrespective of the indication responsively to determining that the fault is associated with an identifiable software failure.

* * * * *